UNITED STATES PATENT OFFICE.

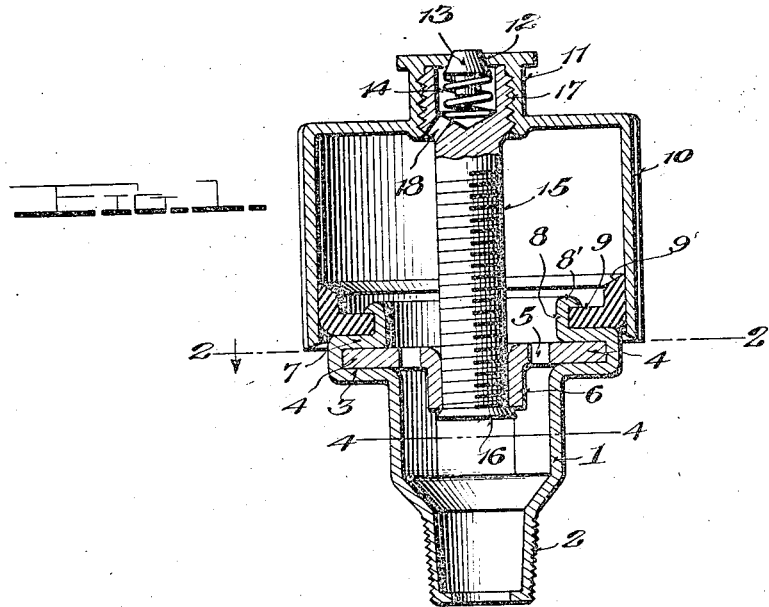

NORMAN W. CUMMINS, OF BRIDGEPORT, CONNECTICUT, ASSIGNOR TO THE BASSICK COMPANY, OF BRIDGEPORT, CONNECTICUT, A CORPORATION OF CONNECTICUT.

LUBRICANT-NIPPLE.

1,391,942.  Specification of Letters Patent.  Patented Sept. 27, 1921.

Application filed March 26, 1921. Serial No. 455,731.

*To all whom it may concern:*

Be it known that I, NORMAN W. CUMMINS, a citizen of the United States, residing at the city of Bridgeport, in the county of Fairfield and State of Connecticut, have invented certain new and useful Improvements in Lubricant-Nipples; and I do declare the following to be a full, clear, and exact description of the invention, such as will enable others skilled in the art to which it appertains to make and use the same.

This invention relates to certain new and useful improvements in grease cups and the primary object thereof is to provide a grease cup which has means to enable filling thereof with a grease gun, and wherein the cap or or cover cannot be removed.

A further object of the invention is to provide a grease cup in which the clamping means for the packing ring and for the spider of the lead screw is formed integral with the cup proper and in which the same means is employed to secure both the spider and the packing ring in clamped position.

A still further object of the invention is to provide a grease cup structure with an improved packing ring, which latter the non-removable cap assures against grease contacting with the effective face thereof by preventing exposure of the ring.

The invention still further aims to provide a lead screw which is formed to receive a controlling valve for the grease cup by means of which the cup may be filled.

Other and further objects will be later set forth and manifested in the course of the following description.

In the drawings:

Figure 1, is a vertical sectional view of the invention;

Fig. 2, is a section on line 3—3 of Fig. 1;

Fig. 3, is a top plan view of the lead screw, and

Fig. 4, is a section on line 4—4 of Fig. 1.

In proceeding in accordance with the present invention, a body 1 is employed having the usual threaded nipple 2 at its lower end and having its upper end turned outwardly to form a seat 3 for a spider 4. The spider 4 has a series of grease openings 5 and a central interiorly threaded depending sleeve 6. The upper end of the body 1, is bent inwardly at 7 and superimposed upon the spider 4 to firmly hold the latter in fixed position on its seat and is then further bent upwardly at 8 to form in conjunction with the inbent part 7, a seat for a packing ring 9. The free edge of the upwardly extending part 8 is then bent outwardly and downwardly at 8' to engage on top of the packing ring 9 to firmly hold the latter to its seat. The part 8, acts as an abutment preventing inward movement of the packing ring. It will thus be apparent that the upper end of the body provides a double clamp, *i. e.*, it holds the spider and the packing ring each in clamped position.

The packing ring is made of leather and is of L-cross-section, its free upper edge being beveled inwardly and downwardly at 9' so as to act to cut or wipe the grease from the inner wall of the cap 10 to thus prevent the grease from contacting with the effective part or the face of the ring.

The cap 10 has a hollow central top connection 11 formed for engagement with a grease gun and further has an inlet 12 controlled by a spring pressed valve 13. The valve 13 extends within a chamber 14 formed in the enlarged upper end of a lead screw 15, the latter being threaded through the sleeve or nut portion 6 and having its lower end headed or upset at 16 to thereby prevent withdrawal of the lead screw from the spider and consequent removal of the cap 10 from the body. The lead screw is suitably connected to the cap, for example by means of the threads shown at 17 and its chamber 14 is formed with a series of grease openings 18 which afford inlets for the grease into the cap 10.

In operation, the grease gun (not shown) is provided with a suitable socket to receive the connection 11, and is actuated to force grease past the valve 12, through chamber 14 and openings 18 to enter the cap, the latter being initially moved to the up position of Fig. 1. After filling of the cup, the gun is removed and the valve 12 returns to the seated position of Fig. 1. The cap may be now turned as desired or found necessary from time to time to feed the grease through the nipple 2, as customary.

The heading of the lead-screw at 16 prevents removal of the cap, thereby avoiding the ingress of grit and loosening of the parts resulting in leakage, which has been found to result in cases where the cap is removed and applied periodically.

The L-shape of the packing ring gives a long flexible bearing against the cap and since the latter cannot be removed, grease cannot be brought into contact with the effective face of the ring.

What is claimed is:

1. In a grease cup, a body having its upper end bent outwardly to form a seat, a spider superimposed on the seat the upper end of the body being further bent inwardly to engage on top of the spider to hold the latter onto its seat and to afford a second seat and being then bent upwardly, an L-shaped packing ring on the second seat, said upwardly bent part having its free end part bent downwardly to clamp the packing ring onto its seat, a cap engaged over the packing ring, and a lead screw borne by the cap and threaded through the spider.

2. In a grease cup, a body having a seat, a spider on the seat, the body having its upper end bent to clamp the spider onto its seat and to form a second seat, a packing ring on the second seat, said upper end of the body being further bent to clamp said ring on said second seat, a cap engaged over and with the packing, and a lead screw borne by the cap and threaded through the spider.

3. In a grease cup, a body having a seat, a spider therein, said body being bent to clamp the spider onto its seat, a packing ring, said body being further bent to clamp the packing ring thereto, a cap engaged over the packing ring, and a lead screw borne by the cap and threaded through the spider.

4. In a grease cup, a body, a spider rigidly mounted therein, a cap on the body, a lead screw connected to the cap and threaded through the spider, said screw having its upper end formed with a grease inlet, and a spring controlled valve for said inlet borne by the lead screw.

5. In a grease cup, a body, an L-shaped packing ring borne by the body, means to secure the base of the ring to the body, a cap engaged over the vertical part of the ring, a lead screw borne by the cap, means borne by the body to engage the screw so that upon rotation of the cap the latter will move downwardly on the body, and means to prevent removal of the cap from the body.

6. In a grease cup, a body, a packing ring borne by the body and having a long vertical part, a cap engaged over said vertical part, a lead screw connected to the cap, and a nut part in the body to engage the lead screw, the lead screw being headed to engage the nut part to prevent removal of the cap.

7. In a grease gun, a body, a spider, a packing ring, means integral with the body to clamp the spider and ring thereto, a cap engaged with the packing ring, and a lead screw connected to the cap and having threaded engagement with the spider.

8. In a grease cup, a body, a spider clamped within said body, a packing ring likewise clamped within said body, the clamping means for said spider and ring being integral with the body, a cap engaged over and with said packing ring, and a lead screw rigidly connected to the cap and threaded through the spider, said cap having an inlet with a spring controlled valve as the sole means for introducing grease within the cup.

In testimony whereof I affix my signature hereto.

NORMAN W. CUMMINS.